(12) United States Patent
Riggs (10) Patent No.: US 8,014,540 B2
(45) Date of Patent: *Sep. 6, 2011

(54) REMOTE CONTROL INTERFACE FOR REPLACEMENT VEHICLE STEREOS

(75) Inventor: Brett D. Riggs, Placentia, CA (US)

(73) Assignee: AAMP of America, Clearwater, FL (US)

( * ) Notice: Subject to any disclaimer, the term of this patent is extended or adjusted under 35 U.S.C. 154(b) by 7 days.

This patent is subject to a terminal disclaimer.

(21) Appl. No.: 12/605,950

(22) Filed: Oct. 26, 2009

(65) Prior Publication Data

US 2010/0040237 A1 Feb. 18, 2010

Related U.S. Application Data (63) Continuation of application No. 11/181,601, filed on Jul. 13, 2005, now Pat. No. 7,613,308, which is a continuation of application No. 09/442,627, filed on Nov. 17, 1999, now Pat. No. 6,956,952.

(60) Provisional application No. 60/108,711, filed on Nov. 17, 1998.

(51) Int. Cl.
*H04B 1/00* (2006.01)
*H04B 1/06* (2006.01)
*H04B 1/18* (2006.01)
*H04H 20/47* (2008.01)
*H02G 3/00* (2006.01)

(52) U.S. Cl. ........... 381/86; 381/2; 455/151.2; 455/352; 340/825.25

(58) Field of Classification Search ............... 381/2, 86; 455/345, 352.3, 151.2, 153.2; 340/825.24, 340/825.25; 710/63, 64, 72; 701/36
See application file for complete search history.

(56) References Cited

U.S. PATENT DOCUMENTS

| | | | |
|---|---|---|---|
| 2,133,151 | A | 10/1938 | Rittenhouse |
| 2,926,240 | A | 2/1960 | Gollub |
| 2,941,173 | A | 6/1960 | Gollub |
| 2,973,431 | A | 2/1961 | Sontheimer |
| 3,099,797 | A | 7/1963 | Piccinini |
| 3,544,901 | A | 12/1970 | Wood |
| 4,194,155 | A | 3/1980 | Hirai et al. |
| 4,291,411 | A | 9/1981 | Muller et al. |
| 4,362,907 | A | 12/1982 | Polacsek |
| 4,455,454 | A | 6/1984 | Umebayashi |
| 4,501,013 | A | 2/1985 | Sato |

(Continued)

OTHER PUBLICATIONS

Steering Wheel Interface, Model PESWI-2, Programming Instructions [online]. Peripheral Electronics, Mar. 23, 2001 (retrieved from internet on Feb. 18, 2005), http//peripheralelectronics.com/periph_products/cd_changer_autos/instructions/peswi2instrnew%20 jc.pdf.

(Continued)

*Primary Examiner* — Devona Faulk
(74) *Attorney, Agent, or Firm* — Weiss & Arons LLP (57) ABSTRACT

An interface circuit for interconnecting the fixed controls of a vehicle to a replacement stereo. The interface circuit is capable of receiving control signals from fixed controls, such as steering wheel controls, backseat controls, handlebar controls, and the like, and then transmitting corresponding control signals to a replacement stereo. In one embodiment, the output signals from the interface circuit are comprised of wireless signals, such as IR signals. In another embodiment, the interface device is programmable such that the interface device can be programmed to emit signals corresponding to the same signals that would be emitted from a handheld remote control sold in conjunction with an after-market stereo receiver.

16 Claims, 8 Drawing Sheets

U.S. PATENT DOCUMENTS

| | | |
|---|---|---|
| 4,503,513 A | 3/1985 | Pogue, Jr. |
| 4,551,714 A | 11/1985 | Giammarese |
| 4,602,358 A | 7/1986 | Sato |
| 5,319,803 A | 6/1994 | Allen |
| 5,339,262 A | 8/1994 | Rostoker et al. |
| 5,339,362 A | 8/1994 | Harris |
| 5,515,345 A | 5/1996 | Barreira et al. |
| 5,555,502 A | 9/1996 | Opel |
| 5,559,499 A | 9/1996 | Haubner |
| 5,691,710 A | 11/1997 | Pietraszak et al. |
| 5,781,123 A | 7/1998 | Koenig et al. |
| 5,790,065 A | 8/1998 | Yaroch |
| 5,790,481 A | 8/1998 | Meitner |
| 5,903,259 A | 5/1999 | Brusky et al. |
| 5,903,481 A | 5/1999 | Kondo et al. |
| 5,949,149 A | 9/1999 | Shitanaka et al. |
| 5,950,166 A | 9/1999 | Hab-Umbach et al. |
| 5,999,104 A | 12/1999 | Symanow et al. |
| 5,999,996 A | 12/1999 | Dunn |
| 6,067,302 A * | 5/2000 | Tozuka ............... 370/464 |
| 6,097,520 A | 8/2000 | Kadnier |
| 6,114,970 A * | 9/2000 | Kirson et al. ......... 340/9.16 |
| 6,119,088 A | 9/2000 | Ciluffo |
| 6,396,164 B1 * | 5/2002 | Barnea et al. ......... 307/10.1 |
| 6,397,186 B1 | 5/2002 | Bush et al. |
| 6,956,952 B1 | 10/2005 | Riggs |
| 7,020,289 B1 | 3/2006 | Riggs |
| 7,613,308 B2 | 11/2009 | Riggs |
| 7,684,570 B2 | 3/2010 | Riggs |
| 2003/0007649 A1 | 1/2003 | Riggs |
| 2005/0249358 A1 | 11/2005 | Riggs |
| 2006/0198535 A1 | 9/2006 | Riggs |
| 2006/0200364 A1 | 9/2006 | Riggs |

OTHER PUBLICATIONS

U.S. Appl. No. 12/698,930, filed Feb. 2, 2010, Brett D. Riggs.

* cited by examiner

REMOTE CONTROL INTERFACE FOR REPLACEMENT VEHICLE STEREOS

CROSS-REFERENCE TO RELATED APPLICATIONS

The present application is a continuation of U.S. patent application Ser. No. 11/181,601, filed on Jul. 13, 2005, which is a continuation of U.S. patent application Ser. No. 09/442,627, filed Nov. 17, 1999, now U.S. Pat. No. 6,956,952, which claims the benefit of U.S. Provisional Application No. 60/108,711, filed Nov. 17, 1998.

BACKGROUND OF THE INVENTION

1. Field of the Invention

The present invention relates to vehicle accessories and, in particular, concerns a device adapted to permit the use of factory installed remote vehicle stereo controls, such as steering wheel stereo controls, with after-market replacement stereos.

2. Description of the Related Art

Vehicles, such as automobiles, boats, and even motorcycles, are often equipped with a stereo system at the factory. Over time, vehicles have been equipped with increasingly more sophisticated stereo systems that provide better sound performance. These stereo systems are quite complex and are capable of playing cassette tapes and CDs and also provide radio reception.

Typically, the control units or receivers for these stereos are positioned adjacent the driver's seat of the vehicle such that the driver can manipulate the stereo controls while driving. While the stereo controls are typically positioned somewhat adjacent the driver, the stereo controls are generally not within the driver's field of view and also may require the driver to remove his or her hand from the steering wheel or handlebars of the vehicle in order to manipulate the stereo controls. This can create a potentially dangerous situation as the driver is now no longer grasping the driving controls with both hands and the driver's attention has been diverted from the path of travel of the vehicle to the stereo controls. Numerous accidents occur as a result of the driver directing their attention away from safely operating the vehicle.

Moreover, stereo controls can also be located in places where they are relatively inaccessible to some of the passengers. For example, if the stereo controls are located adjacent the driver in the front seat of a passenger automobile, the passengers in the back seat may not be able to access the controls to change the operation of the stereo.

To address these particular needs, vehicle manufacturers have begun to offer vehicles that have local stereo control buttons that are not positioned adjacent the stereo receiver but are positioned in more favorable locations for driver or passenger manipulation of the stereo controls. For example, many current production automobiles incorporate local stereo controls mounted on the steering wheel of the vehicle. These local stereo controls typically comprise push-button switches that allow the user to control the operation of the stereo, e.g., increase or decrease volume, change channels or change play format, by manipulating switches on the steering wheel with their thumbs. These types of local stereo controls reduce the likelihood that the driver's attention will be drawn away from the path of travel of the vehicle or from the operation of the vehicle while adjusting the stereo.

Similarly, many passenger vehicles also incorporate local stereo controls that are located remotely from the stereo receiver in locations where passengers can control the operation of the stereo by manipulating the remote stereo control buttons. For example, some larger vehicles incorporate stereo control buttons positioned adjacent the backseat passenger location such that passengers can control the operation of the stereo unit that is mounted adjacent the driver in the front seat.

While these local stereo controls improve the flexibility of controlling the stereo unit, these local stereo controls are generally rendered inoperable when the originally installed stereo receiver is replaced with a replacement stereo receiver. Oftentimes, the owners of vehicles become dissatisfied with the originally installed stereo and want to replace the originally installed stereo with a different after-market stereo unit. Typically, replacement stereo units are of higher quality and offer greater performance characteristics than the originally installed stereo unit. However, installing these after-market stereo units typically renders the local stereo control buttons inoperable as these local stereo control buttons or switches are connected to the original stereo control unit or receiver via a hardwired assembly that is specifically designed to connect these local control buttons to the stereo control unit. The typical replacement stereo receiver is not configured to be able to connect to the hardwired local stereo controls.

One possible solution to this problem is to provide a handheld wireless remote control unit along with the replacement stereo receiver wherein the replacement stereo receiver is adapted to receive wireless signals from the handheld remote control unit. The person holding the handheld remote control unit can then control the operation of the replacement stereo unit without touching the controls on the front face of the stereo receiver. While a handheld remote control unit allows for people positioned remotely from the stereo receiver to control the operation of the replacement stereo, the handheld remote control devices are generally unsatisfactory for many vehicle drivers and passengers.

In particular, the handheld remote control device is often misplaced or lost or is not readily accessible to the driver or the passenger while the vehicle is in operation. Moreover, the handheld remote control device often requires the driver or the passenger to specifically point the device in the direction of the replacement stereo receiver so that the receiver can receive the appropriate wireless signal to change the operation of the stereo. If the driver of the vehicle is using the remote control, the driver may have to take their attention away from the path of travel of the vehicle and the operation of the vehicle, locate the appropriate buttons on the handheld remote control, and then point the handheld remote control in the direction of the stereo control receiver. Hence, while these handheld remote control units allow for remote control of a replacement stereo, they still do not provide the convenience of the local controls positioned in the vehicle that are adapted to be used in conjunction with the original stereo system.

From the foregoing, it will be appreciated that there is a need for a system that will allow existing local stereo controls to be used to control a replacement stereo system. To this end, there is a need for a system that will receive signals from local stereo control switches mounted within the vehicle designed to control the originally installed stereo and then provide appropriate signals to a subsequently installed stereo receiver.

SUMMARY OF THE INVENTION

The aforementioned needs are satisfied by the stereo control interface device of the present invention. In one aspect, the device is adapted to receive signals from local stereo control devices located at positions within a vehicle that are remote from the stereo control unit or receiver and then produce output signals which can be provided to a replacement stereo unit so that the device will translate the signal from the existing local stereo control device into a format which can be used to change the function of the replacement stereo in the same manner that manipulation of the local controls would change the original stereo.

In one particular embodiment, the local stereo controls comprise one or more switches or buttons located remotely from the stereo control unit which a user, such as a driver, can manipulate to control the operation of the stereo control unit. In this aspect, the local stereo control switches provide a signal to the interface device via hardwiring and the interface is adapted to receive the signal and then produce a corresponding wireless signal that is transmitted to a wireless receiver on the after-market replacement stereo control unit such that manipulation of the local stereo controls results in a corresponding control signal being sent to the after-market replacement stereo.

In another aspect of the invention, the interface device is adapted to be programmable. The user can install the interface device and then program the interface to produce output signals that, when received by the replacement stereo control unit, will result in the stereo control performing an operation that corresponds to the operation activated by the local control positioned within the vehicle.

It will be appreciated that the interface of the present invention allows for the continued use of local stereo control devices, such as steering wheel switches or buttons, handlebar switches, or passenger switches, to continue to be used in conjunction with replacement after-market stereo control units that are replacing the original installed stereo control unit. The flexibility of using this device, in at least one aspect, is enhanced due to the interface being programmable by the installer. These and other objects and advantages of the present invention will become more fully apparent from the following description taken in conjunction with the accompanying drawings.

DETAILED DESCRIPTION OF THE PREFERRED EMBODIMENT

Figure 1:
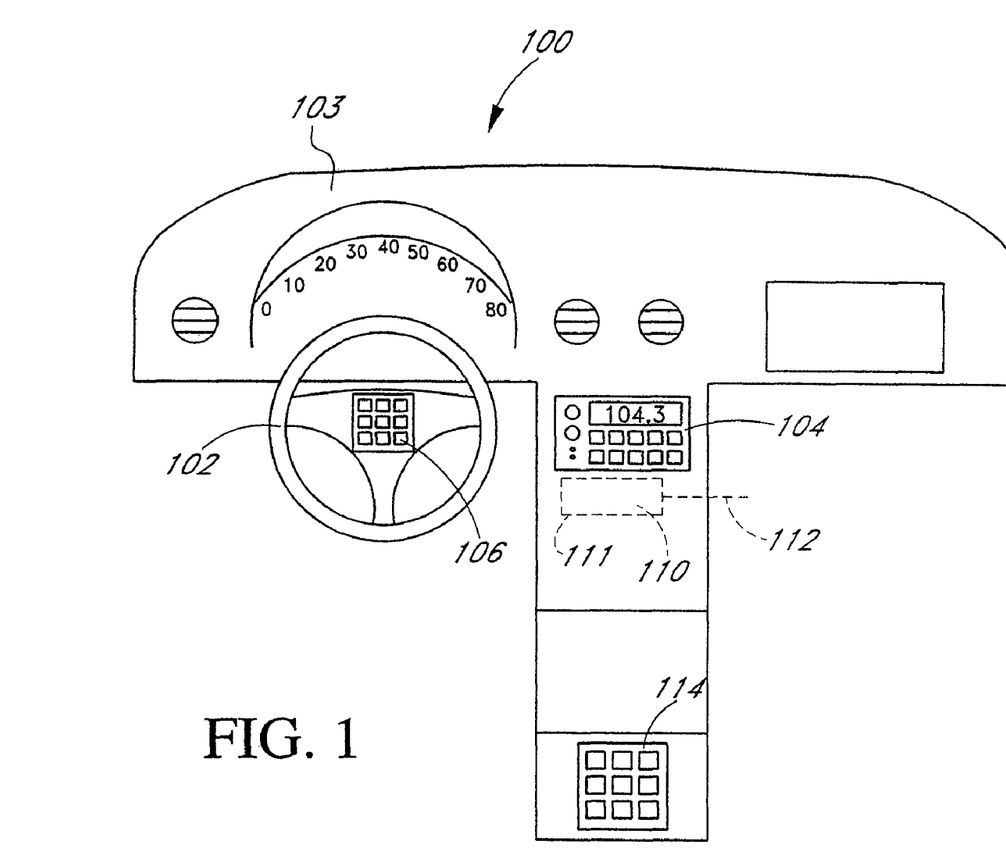
FIG. 1 is an isometric view of a typical vehicle dashboard incorporating local stereo control buttons located on a steering wheel of the dashboard and located adjacent the backseat and further including an interface device and a replacement stereo control unit or receiver.

Reference will now be made to the drawings wherein like numerals refer to like parts throughout. FIG. 1 illustrates a perspective view of an exemplary vehicle interior incorporating the components of a remote stereo control interface system 100. The remote stereo control interface system 100 is comprised of factory installed local stereo control buttons or switches 106 generally located in the center hub of a typical vehicle steering wheel 102. The local control buttons 106 are used for the driver to make selections to the replacement after-market car stereo 104, wherein these selections may include AM/FM, seek, volume up, volume down, play, etc.

The advantage of making these desired selections with the control buttons 106 is to reduce the occurrence of the driver moving his or her eyes away from the road or hands away from the steering wheel when making selections at the dash mounted stereo receiver. Hence, the local steering wheel controls 106 are installed in the factory to give the driver greater convenience in controlling the operation of the factory installed stereo while driving. These local steering wheel controls 106 are typically hardwired to the factory installed stereo receiver such that replacement of the factory installed stereo receiver typically disables the local controls. However, as will be described in greater detail below, a remote interface circuit 110 is adapted to be connected to the existing local steering wheel controls 106 and communicate with a replacement stereo receiver 104 that replaces the original stereo receiver such that the existing local steering wheel controls 106 can be used to control the operation of the replacement stereo.

Figure 3:
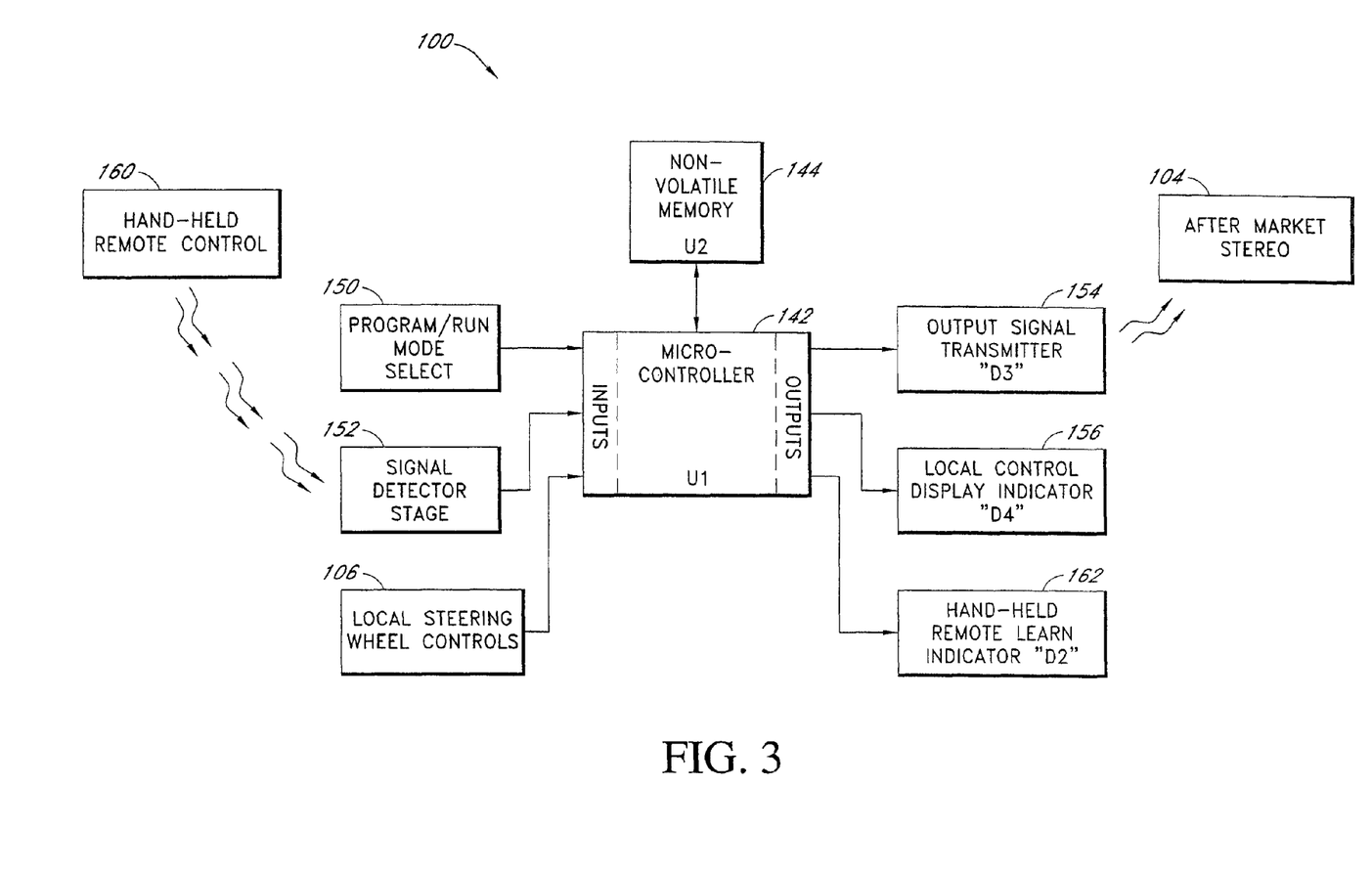
FIG. 3 is a schematic block diagram illustrating the basic configuration of the remote stereo control interface device of FIGS. 1 and 2.
Figure 4A:
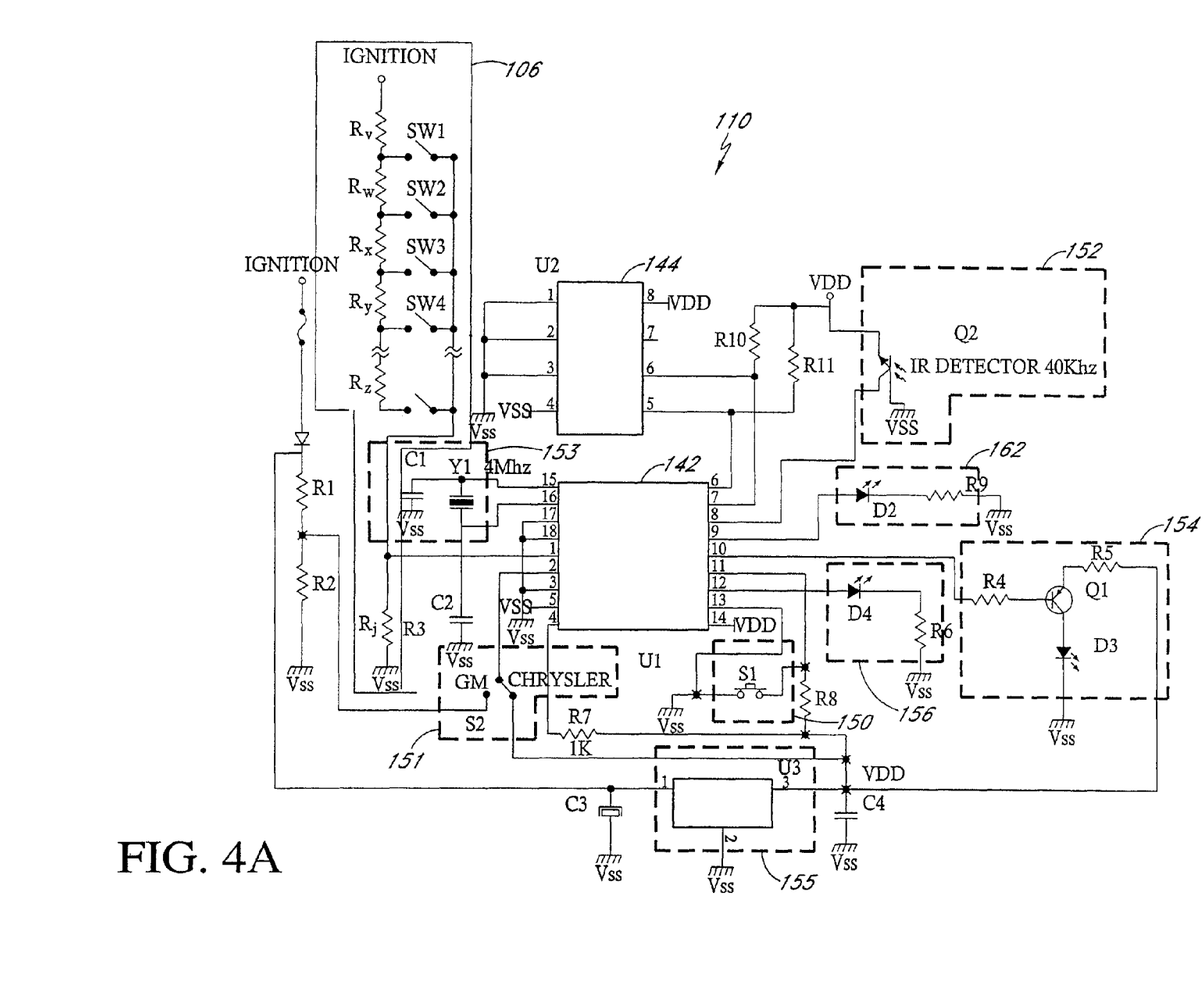
FIG. 4A is a schematic electrical diagram of the circuitry of one embodiment of the remote stereo control interface device.
Figure 4B:
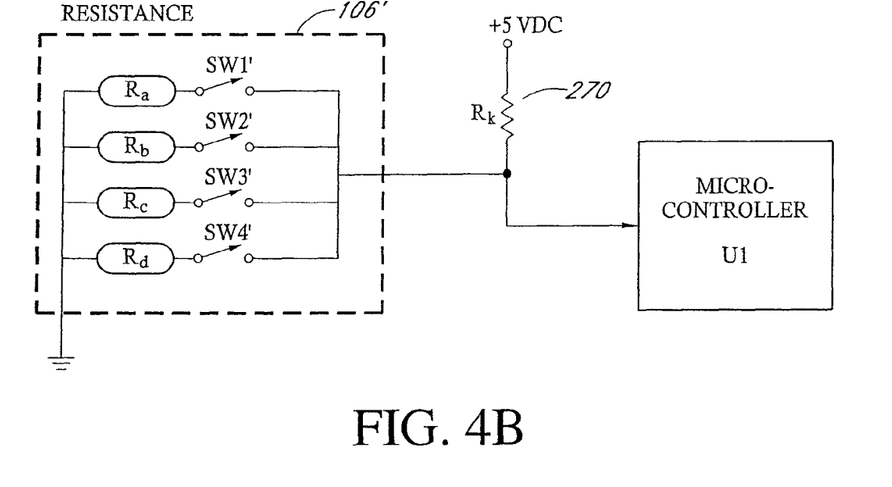
FIGS. 4B and 4C are partial schematic illustrations illustrating alternative configurations of local stereo controls.
Figure 4C:
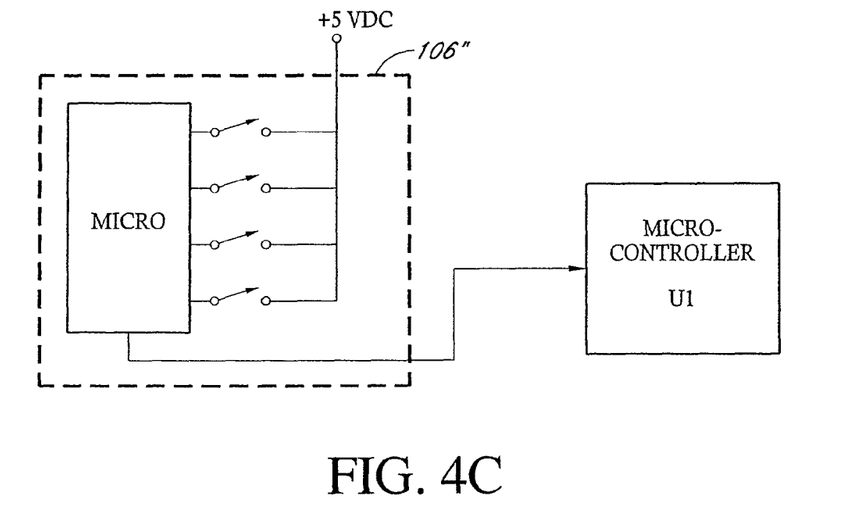

In particular, the local control buttons 106 are hard wired to the remote interface circuit 110 which is illustrated in phantom lines and is described in detail in reference to FIGS. 4A, 4B and 4C. The remote interface circuit 110, in this embodiment, is positioned within a casing 111 that is rectangular in shape approximately 4.0 inches long, 2.0 inches wide and 2.0 inches in height. As is illustrated in FIG. 1, the interface control casing 111 is adapted to be mounted unobtrusively behind the dashboard 103 of the vehicle so as to be generally hidden from view. The remote interface circuit 110 is adapted to be connected to the steering wheel controls 106 via the existing hardwiring of the vehicle and is also adapted to send signals to replacement stereo receiver 104 via a transmission cable 112. In this embodiment, the transmission cable 112 includes a signal transmitter 154 (See, FIG. 3) that is located in line of sight of a remote signal receiver (not shown) on the after-market stereo receiver 104. The transmission cable 112 is illustrated with phantom lines and is generally 4 feet in length and is located in the vehicle console or dashboard 103 such that the tip of the transmission cable 112 that is comprised of the output signal transmitter 154 is positioned generally within close proximity of the stereo 104.

Generally, the replacement stereo receiver 104 is used in place of an original stereo receiver, such as the factory installed stereo receiver, that has become defective or out-of-date. It is fairly common that the replacement stereo receiver 104 is lower in price or includes additional features over the original receiver. The replacement stereo receiver 104 can be any of a number of after-market receivers, such as those manufactured by Panasonic, Clarion, Denon, Eclipse, JVC, Kenwood, Pioneer, Sony, etc. The typical after-market stereo receiver is equipped with a wireless receiver, such as an infrared (IR) receiver, that is adapted to receive wireless signals from a handheld remote control. This enables the driver to use a handheld remote control to adjust the stereo's operation, e.g., change channels, volume, etc. As will be described in greater detail below, the interface circuit 110 is adapted to be programmed to produce similar wireless signals produced by the handheld remote control that are recognizable by the after-market stereo receiver upon receipt of the corresponding signals from the local steering wheel control switches 106.

The remote interface circuit 110 can also be adapted to attach to one or more alternative local stereo control switches 114, illustrated in FIG. 1, wherein the alternative local control switches 114 are positioned, in this embodiment, adjacent the rear seating area of the vehicle. The alternative local stereo controls 114 are shown in an exemplary location and it can be appreciated that the alternative local switches 114 may be positioned almost anywhere in the vehicle suitable for remote function selection. These types of alternative stereo control keypads or switches are typically positioned so that people sitting remotely from the stereo receiver can still control the basic functions of the stereo such as changing the program, the channel, the volume, etc.

The remote interface circuit 110 is connected to the existing hardwiring of the alternative local stereo control switches 114 and is then programmed to provide appropriate signals to the replacement stereo 104 so as to be able to provide commands to the replacement stereo 104 corresponding to the commands of the selected local switches 114. Hence, the remote interface circuit 110 can be used to receive signals from alternative stereo control function switches located anywhere within a vehicle such that the switches can be used to control a replacement stereo.

Figure 2A:
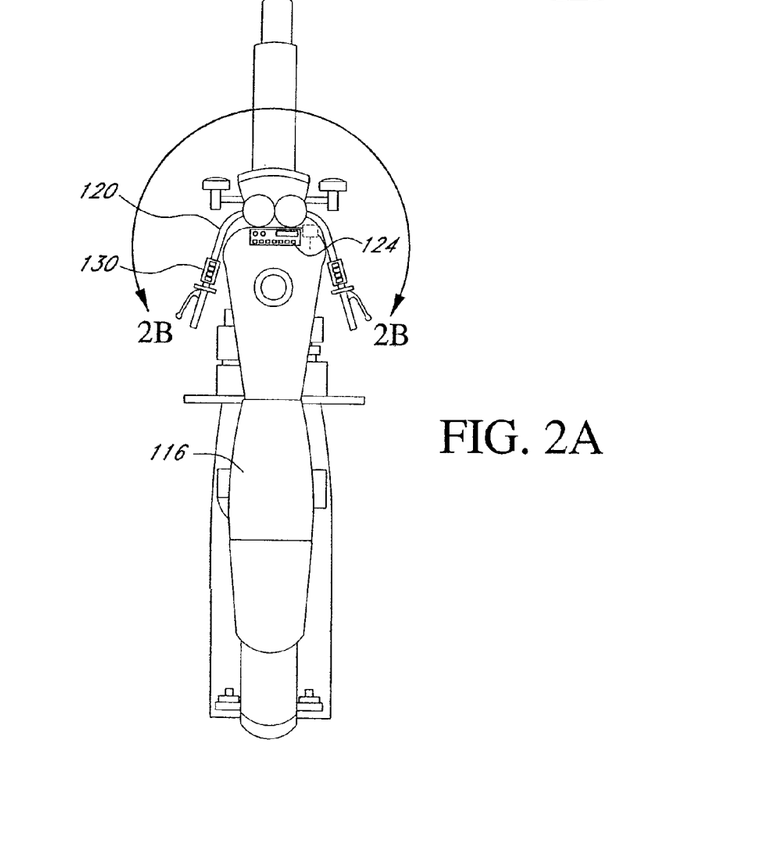
FIGS. 2A and 2B are top isometric illustrations of a motorcycle incorporating local stereo controls mounted on the handlebars of the motorcycle and an interface device that allows for the communication of signals from the local stereo controls to a replacement stereo receiver.
Figure 2B:
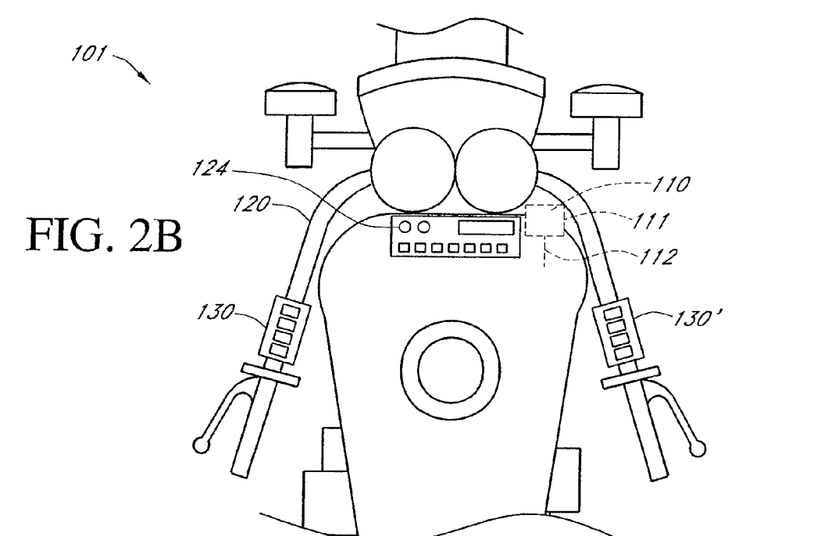

FIGS. 2A and 2B illustrate another embodiment of a system 101, similar to the system 100 that was shown in FIG. 1. In particular, FIG. 2A illustrates a top view of a typical motorcycle 116 with handlebars 120 for steering. It is commonly known that expensive stereo systems are used on many high end motorcycles 116. Oftentimes, the motorcycle 116 is equipped with local stereo controls 130 positioned on the handlebars 120 so that the rider does not have to remove his or her hands from the handlebars 120 of the motorcycle 116 while changing radio channels, adjusting volume, adjusting play selection, and the like. However, these local stereo controls 130 are also typically hardwired to the existing factory installed stereo receiver such that replacement of the factory installed stereo receiver often results in the handlebar stereo controls 130 not being usable.

The remote control interface device 110 can be adapted to utilize the factory mounted handle bar stereo controls 130 with a replacement stereo receiver 124 by receiving the signals from the local stereo controls 130 and transmitting a corresponding signal that is recognizable by the replacement stereo receiver 124 mounted on the motorcycle. In particular, the system 101 also includes the remote interface circuit 110 that is positioned within the casing 111 (shown in phantom) that is hardwired to the existing controls 130. The remote interface circuit 110 includes the transmission cable 112 that is positioned so that the output signal transmitter 154 is positioned generally within close proximity of the replacement stereo receiver 124. As discussed above, the replacement stereo receiver 124 is preferably equipped to receive wireless signals, such as infrared (IR) signals, from the transmitter 154 to change or adjust the stereo operation.

FIG. 3 is a block diagram of the remote stereo control interface system 100 of the preferred embodiment. The control interface system 100 incorporates a microcontroller 142 that is adapted to receive electrical signals from various switches, sensors and controls located in the vehicle for the purpose of controlling the replacement stereo receiver 104. In particular the microcontroller 142 is adapted to receive a plurality of electrical signals from the local stereo controls, such as either the steering wheel controls 106, the alternate backseat controls 114 of FIG. 1, or the handlebar controls of FIGS. 2A and 2B. The microcontroller 142 is also adapted to receive a signal from a detector stage 152 for the handheld remote control transmitter 160. As is understood in the art, the detector stage 152 is adapted to receive and demodulate a wireless signal sent by a handheld remote control unit 160 for the stereo receiver 104. As discussed above, the stereo receiver 104 is preferably adapted to receive IR signals from a handheld remote control. As will be described in greater detail below, the microcontroller 142 is preferably adapted so as to be able to receive, from the remote control 160, the wireless signal for controlling a particular stereo function, store this signal and then reproduce and broadcast this signal to the after-market stereo receiver when a driver or passenger in the vehicle activates a local control such as the controls 106, 114 or 130 corresponding to function of the stored signal.

The microcontroller 142, in this embodiment, also receives a signal from a program mode select switch 150 that is attached to the casing of the remote interface circuit 110. The program mode select switch 150 when selected, instructs the microcontroller 142 to enter a program mode, allowing the microcontroller 142 to learn and record the specific control functions selected on the local controls 106, 114, 130 and the handheld stereo remote control transmitter 160. These signals are stored into non-volatile memory 144 located on-board the remote interface circuit 110. It will be appreciated that the pre-selected specific control functions selected on the steering wheel stereo controls 106 and the handheld stereo remote control 160 will not be lost or discarded upon the removal of vehicle power when the ignition is switched off to the remote interface circuit 110 and the microcontroller 142. The microcontroller 142, when not in a program mode, may be in a run mode or an off state. A flowchart of the program mode and run mode shall be discussed in reference to FIGS. 5A and 5B below.

The microcontroller 142 is also adapted to output electrical signals to various output and display devices. In particular, the microcontroller 142 communicates data and instructions to the stereo receiver 104 via an output signal transmitter 154 located at the tip of the transmission cable 112. The output signal transmitter 154 in combination with the microcontroller 142 during the run mode of operation generates a carrier signal with the modulated data and instruction information, wherein this information is transmitted to the after-market stereo receiver 104 for the purpose of wireless stereo function selection and modification.

Other output devices attached to the microcontroller 142 include a local control display indicator 156 and a handheld remote learn indicator 162. The local control indicator 156, in this embodiment, is a light emitting diode and provides the programmer a visual indication as to the status of the programmability of each local control 106 function in the manner that will be described in greater detail hereinbelow. Furthermore, the handheld remote learn indicator 162 is controlled by the microcontroller 142 and provides the programmer a visual indication of the status of the programmability of each corresponding handheld remote instructions transmitted by the handheld stereo remote control 160. The function of the indicators 156, 162 will be described in greater detail in reference to FIGS. 5A and 5B hereinbelow.

FIG. 4A is a schematic circuit diagram of the remote interface circuit 110, wherein the remote interface circuit 110 is comprised of the microcontroller 142, the non-volatile memory device 144, a plurality of inputs to the microcontroller 142 and outputs from the microcontroller 142. In particular, in this embodiment, the local controls are comprised of stereo control buttons 106 which form a voltage divider network that connects to the vehicle ignition voltage source. As a stereo control button 106 is selected, the corresponding resistive network is 'placed' in the circuit and the voltage drop across this resistive element is applied to an analog-to-digital input port of the microcontroller 142. The resistive network of the stereo control buttons 106 is comprised of a plurality of resistors (Rv, Rw, Rx, Ry, etc.) in a series configuration along with a plurality of stereo control buttons 106 (Sw1, Sw2, Sw3, Sw4, etc.). One side of each of the stereo control buttons 106 (Sw1, Sw2, Sw3, Sw4, etc.) is connected together and in a series configuration with resistor Rj which is located on-board the remote interface circuit 110.

In operation, the stereo control buttons 106 operate as follows. When the driver depresses one of the buttons 106 thereby activating one of the switches Sw1-Sw4, etc., the vehicle ignition voltage source is dropped by the corresponding resistor Rv-Rz, etc. so that a particular voltage signal is produced. This particular voltage signal can then be provided to the original stereo and the original stereo is programmed to recognize the particular voltage signal as corresponding to a signal to implement a particular stereo function. For example, depressing switch Sw1 may instruct the factory stereo to increase the volume by a particular amount or it may instruct the stereo to change the radio channel to a different preset station.

In the implementation shown in FIG. 4A, the voltage signal from the remote vehicle controls 106 is provided to the microcontroller 142. As will be described in greater detail below, the microcontroller 142 is preferably configured to receive a particular voltage signal and then produce a corresponding wireless signal that will result in the replacement stereo 104 changing function in the same manner that the factory installed stereo would change function in response to receiving the same voltage signal. In particular, in one embodiment, the interface circuit 110 is designed to produce IR signals that correspond to the signals received from the remote vehicle control buttons 106, 114 or 130.

As illustrated in FIG. 4A, in this implementation, a plurality of different voltage signals are sent to the microcontroller 142 in response to the user activating the plurality of different switches Sw1-Sw4. The voltage from the switches Sw1-Sw4 is preferably provided to an analog to digital converter. In one embodiment, the microcontroller 142 is programmable and the digital signal 142 can be stored in the memory 144 such that when the microcontroller 142 receives this voltage, the stored voltage can be referenced to produce a corresponding wireless signal in the manner that will be described in greater detail below.

In the illustrated embodiment, a GM-Chrysler selector switch 151 is also located on-board the remote interface circuit 110. In particular, the remote interface circuit 110 incorporates the GM-Chrysler selector switch 151 such that when placed in the GM position allows for a voltage drop produced across R2 to be fed to another analog-to-digital input port of the microcontroller 142. As with the voltage divider networks configured within the stereo control buttons 106, the series combination of resistor R1 and R2 also form a voltage divider network with a tap formed at the node of R1 and R2 and the vehicle ignition again serving as a voltage excitation source. The sampled voltage by the microcontroller 142 at this R1 and R2 node forms a reference voltage level against which the same ignition voltage excites the network formed by the stereo control buttons 106 and produces selected output voltages. A software algorithm that runs in the microcontroller 142 measures these voltages and provides compensation for these voltage fluctuations that occur on the vehicle ignition when the vehicle is a General Motors product. Moreover, when the GM-Chrysler selector switch 151 is placed in the Chrysler position, the reference voltage now becomes VDD (+5 VDC) shown in FIG. 4A at output pin 3 of voltage regulator U3. Chrysler vehicles currently use a regulated 5 Volt supply that does not change with ignition voltage conditions.

Hence, in this embodiment, the interface circuit 110 is configurable so as to be adapted for more than one different make or model of vehicle. It will be appreciated that the electrical systems of different makes and models of vehicles vary greatly from vehicle to vehicle. In this particular embodiment, the interface circuit 110 can be made as universal as possible such that a single device can be configured to be used with many different types of vehicles.

As is also illustrated in FIG. 4A, the microcontroller also receives an input signal from the IR detector stage 152, wherein the detector stage 152 is formed by the transistor Q2. The transistor Q2 is an infrared detector device adapted to accept modulated commands and data from the handheld remote control transmitter 160 that is provided with the after-market replacement stereo receiver 104. As discussed above, the after-market stereo receiver 104 is preferably adapted to receive wireless signals from the handheld remote to control stereo function. In this embodiment, the interface circuit 110 is adapted to be able to receive and store the wireless signals from the remote control 160 so that the interface circuit 110 can be programmed to reproduce a wireless signal corresponding to the signal produced by a local steering wheel switch 106.

In this embodiment, the interface circuit receives a modulated carrier signal that is then provided to the microcontroller 142. In particular, the modulated carrier signal is provided by the detector stage 152 to a bi-direction input-output port of the microcontroller 142. Subsequently, the data pattern received by the microcontroller 142 from the detector stage 152 is stored in the non-volatile memory 144 via a serial data transfer link from the microcontroller 142 that has two pull-up resistors R10 and R11. As will be described in greater detail below, this stored data pattern can be retrieved at a later time for use in the run mode such that the interface circuit 110 can reproduce the wireless signal produced by the handheld remote control 160 to change stereo function in response to receiving a corresponding command from the local stereo control devices such as the steering wheel controls 106.

In this embodiment, the microcontroller 142 receives several other inputs including inputs from a program mode switch 150. The program mode switch 150 is mounted on the PC board and extends through the casing 111 such that a programmer can depress the switch and induce the microcontroller 142 to enter into a program mode whereby the microcontroller 142 can be programmed in the manner described below in conjunction with FIG. 5A.

The interface circuit 110 also includes several output devices including a local program indicator 156 comprised of a light emitting diode D4 in this embodiment. As will be described in greater detail below, the local indicator 156 is a diode that is mounted on the PC board and is visible through the casing 111. The microcontroller 142 is adapted to provide a visual indication, via the local indicator 156, to the programmer when the microcontroller 142 has received a signal from the remote vehicle stereo control devices 106, such as the steering wheel switches. Similarly, the interface circuit 110 also includes a handheld remote learn indicator 162 that is comprised of a light emitting diode D2 in series with a current limiting resistor R9 connected to the microcontroller 142. The light emitting diode D2 is preferably mounted to the casing 111 so as to be visible by the programmer and the microcontroller 142 is programmed so as to be able to provide a visual indication to the programmer when the microcontroller 142 has received a signal from the handheld remote control 160.

The interface circuit 110 also includes the output signal transmitter 154 which is comprised of an infrared light emitting diode D3, a driver transistor Q1, a series base current limiting resistor R4, a current limiting resistor R5 and the output switching port at pin 10 of the microcontroller 142. The output signal transmitter 154 comprises a light emitting device that is capable of reproducing the wireless signals previously stored in the memory 144. The output signal transmitter 154 provides these signals via the cable 112 so that the wireless signals can be transmitted to the replacement stereo 104. The manner in which the wireless signals are programmed and then transmitted to the stereo will be described in greater detail in conjunction with FIGS. 5A and 5B.

FIG. 4A also illustrates that a crystal controlled clock 153 comprised of a 4 MHz crystal Y1 in parallel with capacitor C2 and in parallel with capacitor C1 to form the oscillator, provides an input signal to the microcontroller 142. Moreover, the circuit 110 also includes a voltage regulator circuit 155 that is comprised of a voltage regulator U3, an output filter capacitor C4, and an input filter capacitor C3. The voltage regulator U3 provides a steady state +5 vdc output voltage which is adapted to supply the excitation voltage for the non-volatile memory 144, the microcontroller 142, the detector stage 152, and the output signal transmitter 154.

The circuit of FIG. 4A illustrates one particular implementation of the interface circuit 110. As illustrated, the interface circuit 110 receives signals from local stereo control devices, such as steering wheel buttons or switches, passenger switches, handlebar switches and the like, and then translates these signals into signals that are recognizable by the replacement stereo receiver 104. In this particular implementation, the interface circuit 110 provides corresponding wireless signals, such as IR signals, to the replacement stereo 104 upon receipt of corresponding input signals from the steering wheel switches 106. It will be appreciated that the exact configuration of the interface circuit 110 can vary depending upon the configuration of the vehicle and the replacement stereo receiver 104 without departing from the present invention. For example, FIGS. 4B and 4C illustrate several other different manners in which local stereo control buttons or switches are implemented in different types of vehicles.

For example, FIG. 4B illustrates a configuration of a local stereo control device 106', which uses a resistor ladder configuration such that each switch closure selection on the remote vehicle stereo control 106' connects a different value resistor to the vehicle ground. In particular, if switch Sw1 is depressed on the stereo control button 106', then resistor Ra will be placed in series with fixed resistor Rk and +5 vdc will provide the excitation voltage across the combined resistance of (Ra+Rk) producing a specific voltage drop across Ra. This specific voltage drop across Ra is fed to a analog-to-digital input port of the microcontroller 142 that corresponds to the selected switch function Sw1. Moreover, sequential switch selections by Sw1, Sw2, Sw3, etc. create specific voltage drops that are sampled by the microcontroller 142 and are used in both the program mode and the run mode in the previously described manner.

Similarly, FIG. 4C illustrates another embodiment of the stereo control button 106" used by a variety of automobile manufacturers. In particular, this embodiment is shown with a microprocessor and a plurality of switches, wherein each switch closure on the stereo control button 106" generates a unique serial data command that is adapted to be accepted by the microcontroller 142 via digital input port.

Figure 5A:
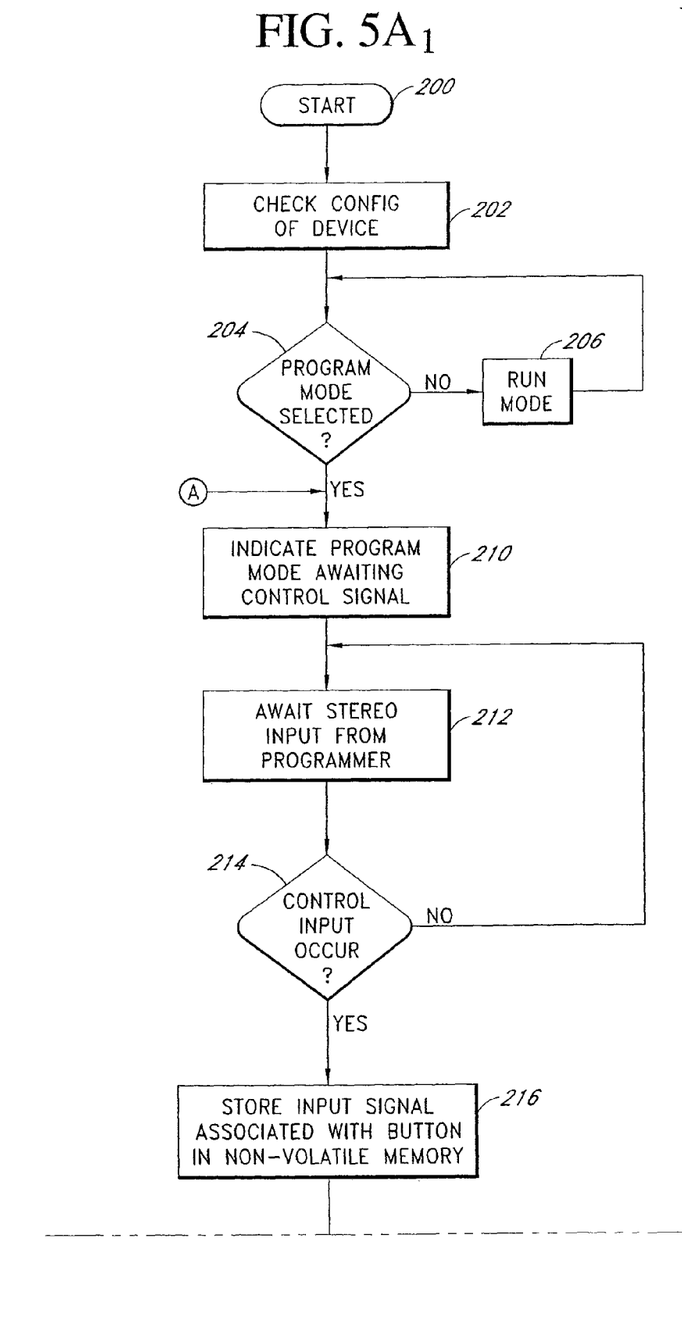
FIG. 5A is an exemplary flow chart illustrating the operation of a microcontroller of the remote stereo control interface device in a program mode.
FIG. 5B is an exemplary flow chart illustrating the operation of the microcontroller of the remote stereo control interface device in a run mode.
Figure 5A:
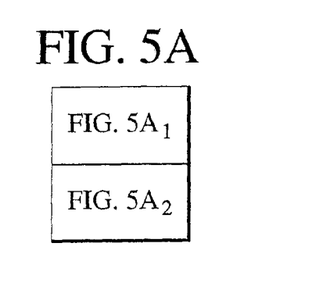
Figure 5A:
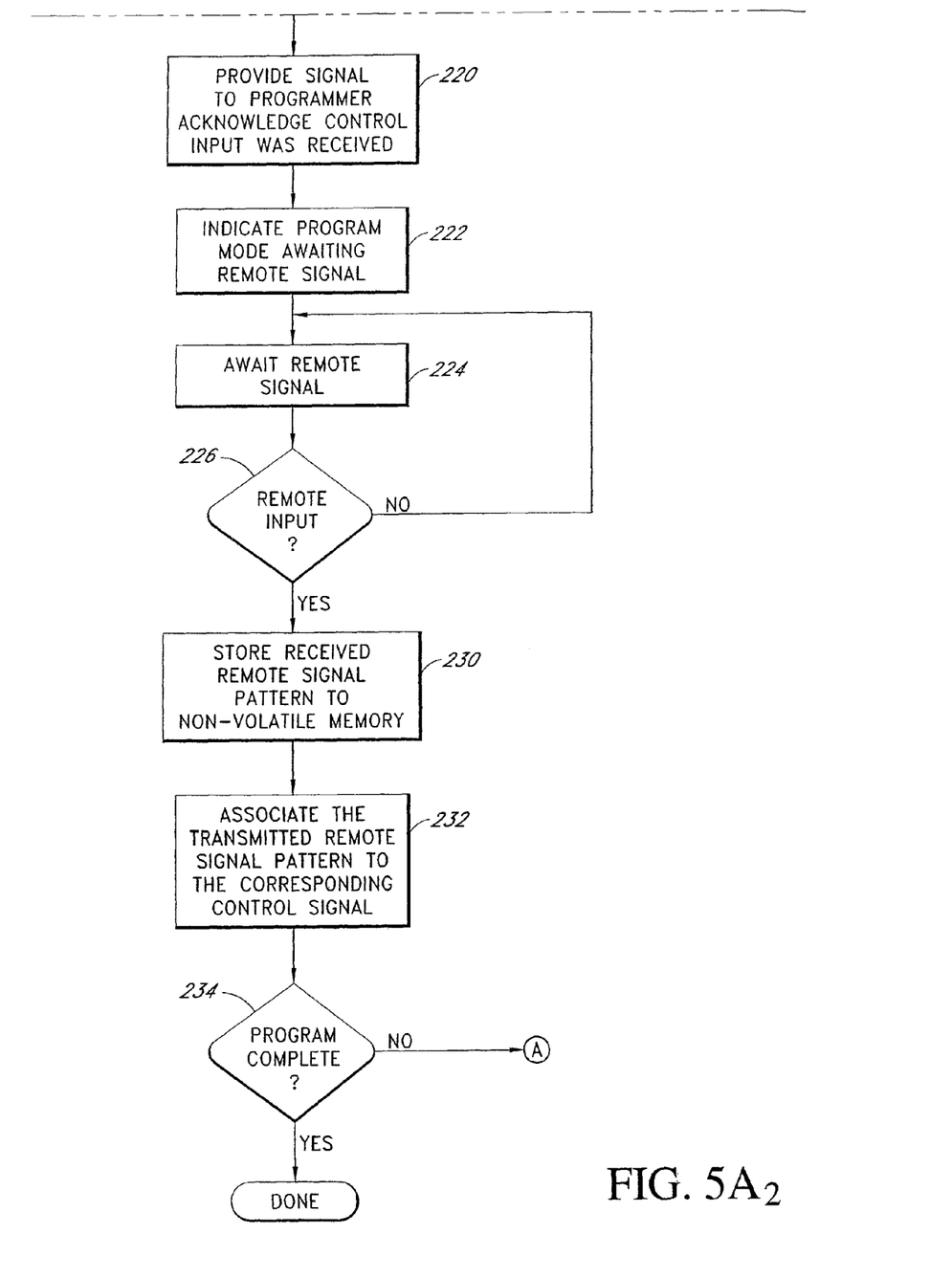

FIG. 5A is a flowchart which illustrates the program mode of operation of one embodiment of the remote stereo control interface circuit 110 as a programmer programs the circuit 110 to send appropriate wireless signals to the after-market stereo 104 in response to receiving signals from the remote vehicle controls 106. Advantageously, the circuit 110 can be programmed by the programmer using the vehicle's local controls 106 and the handheld remote control 160. Basically, the programmer simply manipulates a particular local control 106, 114, 130 and then depresses a corresponding button on the handheld remote control 160 to program the circuit 110 so that the circuit 110 can send the appropriate wireless signal to the replacement stereo receiver 104.

In particular, as shown in FIG. 5A, the microcontroller 142, from a start state 200, performs a configuration 202 of microcontroller 142 ports in state 202 and determines, in decision state 204, whether the program mode switch 150 located on the casing of the remote interface circuit 110, has been selected. If the microcontroller 142 determines, in decision state 204, that the program mode switch 150 has not been selected, the microcontroller 142 then enters a run mode, in state 206, where the microcontroller 142 is in an operation mode that will be described in greater detail in reference to FIG. 5B.

If the microcontroller 142 has determined, in decision state 204, that the program mode switch 150 was selected, the microcontroller 142 enters the program mode and performs a visual indication, in state 210, that the microcontroller 142 is awaiting a control signal from the stereo control buttons 106. In this embodiment, the microcontroller 142 illuminates the display indicator 156 located on the casing 111 of the interface circuit 110.

The microcontroller 142 waits to receive a signal from the vehicle remote controls 106 in state 212. In particular, the programmer selects one of the local stereo control buttons 106, 114, 130 and this results in a local stereo control signal being provided to the microcontroller 142 in the manner described above. The microcontroller 142 then ascertains, in decision state 214, whether the local control signal has been received. If the microcontroller 142 determines that a local control input has been received, the microcontroller 142 stores the local control input signal to the non-volatile memory 144 in the state 216. The microcontroller 142 also provides a visual indication or acknowledgement to the programmer that the control signal was received in a state 220, wherein the light emitting diode D4 of the indicator 156 is activated.

The microcontroller 142 then provides, in state 222, a visual indication to the programmer that the microcontroller 142 is awaiting a remote signal from the handheld stereo remote control 160. The visual indication to the programmer is provided by the handheld remote learn indicator 162, wherein the light emitting diode D2 located on-board the remote interface circuit 110 is turned on. The microcontroller 142 then awaits a signal from the remote control 160 in state 224. The signal from the handheld remote control 160 is produced in response to the programmer depressing a button that has the same function as the local remote control button 106, 114 or 130 previously activated by the programmer and detected by the microcontroller 142 in state 212. The signal is provided by the remote control 160 to the microcontroller 142 via the signal detector stage 152 (FIG. 3) in the previously described manner.

The microcontroller 142 continues to await the signal from the remote control 160 until the microcontroller determines, in decision state 226, that such a signal has been received. Once the remote signal is received, the microcontroller 142 stores the received remote signal pattern to non-volatile memory 144, in state 230, and preferably, in state 232, associates the wireless remote signal pattern to the corresponding control input defined in state 216. In this embodiment, the association or mapping is done by storing the signal corresponding to the received wireless signal from the handheld remote control 160 in a data location in the memory 144 adjacent the data location for the corresponding local control signal. Hence, for each vehicle local control signal, a corresponding handheld remote control signal can be stored in the memory 144 such that subsequent activation of the local controls 106, 114, 130 will enable the microcontroller 142 to recall the corresponding wireless signal from the memory 144 and produce the corresponding wireless signal via the output transmitter 154 in the manner that will be described in greater detail below.

Upon the completion of the state 232, the microcontroller 142 determines, in decision state 232, whether the programming has been completed. If the programming has not been completed the microcontroller 142 returns to a state 210 where the microcontroller 142 awaits the next vehicle remote control signal. In this way, the programmer can program the interface circuit 110 to store an input signal from the local controls mounted within the vehicles and also store and map a corresponding input signal from the handheld remote control 160 that is used to control the replacement stereo. As will be discussed in greater detail below, the microcontroller 142 is adapted to retrieve the corresponding input signal from the handheld remote control and send this signal to the replacement stereo receiver 104 in response to receiving the corresponding signal from the corresponding local control switch or button within the vehicle.

Figure 5B:
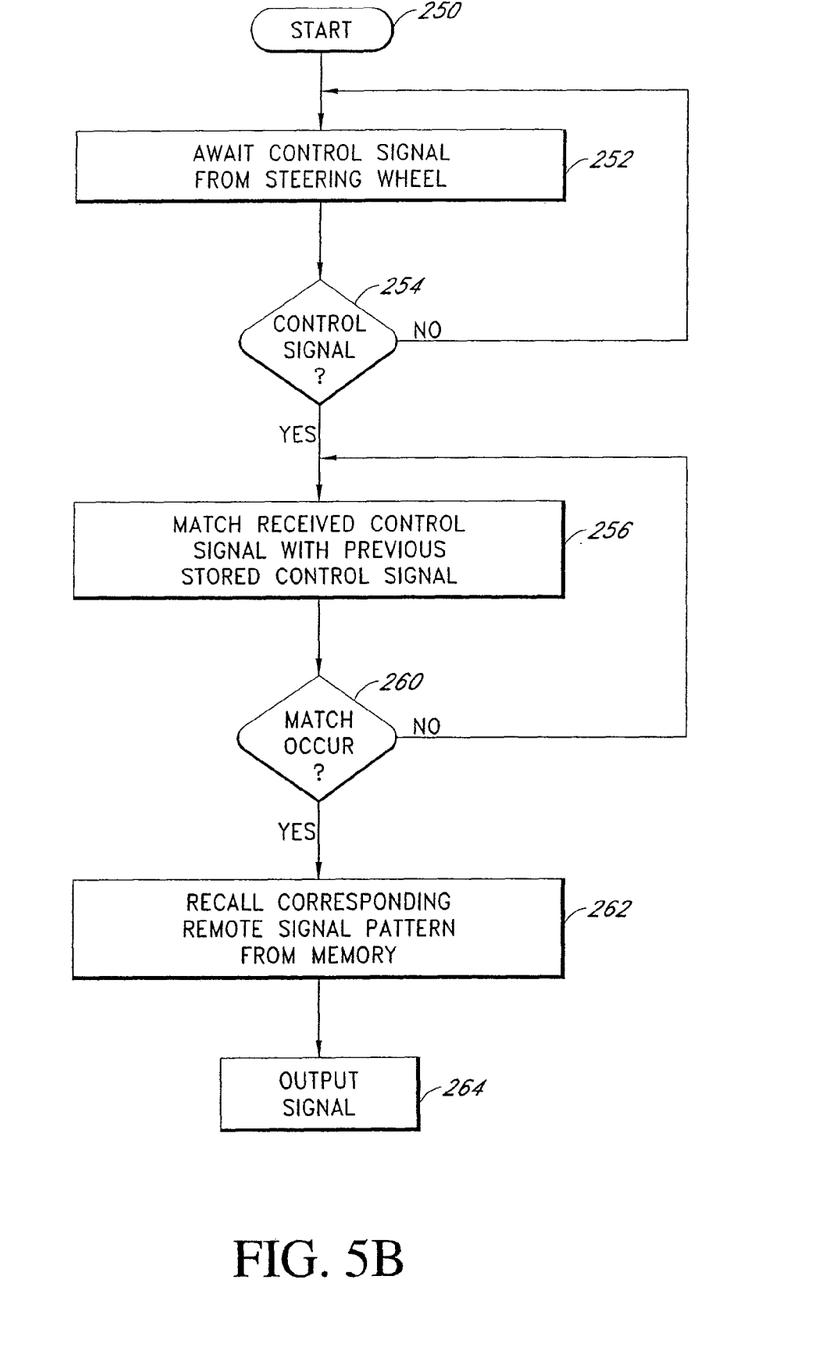

FIG. 5B is a flow chart which illustrates the operation of the interface circuit 110 as it is in a run mode wherein the interface circuit 110 can receive local control signals from any of the local vehicle controls 106, 114, 130 and then provide corresponding output signals that are recognizable by the replacement stereo receiver 104. In particular, the microprocessor 142, from a start state 250, awaits a control signal from the local controls 106, 114, 130 in state 252. As discussed above, the local controls 106, 114, 130 can be comprised of the steering wheel controls or the passenger controls or both, illustrated in FIG. 1, the passenger or handlebar controls from a motorcycle, illustrated in FIGS. 2A and 2B, or any other control that is remotely located from the face of the control unit of the stereo receiver.

Upon the microprocessor 142 determining, in decision state 254, that a local control signal has been received from the remote vehicle control 106, the microcontroller 142 then matches, in state 252, the received local control signal with a previously stored output signal in the memory 144. As discussed above in connection with the description of the program mode of the microcontroller 142 in FIG. 5A, by sequentially programming each of the vehicle local controls 106, 114, 130 with the corresponding button on the handheld remote control 160, the microcontroller 142 is able to map these two signals such that the microprocessor 142 is capable of recalling the corresponding output signal from the memory 144. In other words, the microcontroller 142, upon receipt of the input signal from the vehicle remote control 106, recalls from the memory 144, a digital signal that can then be used to generate an appropriate output signal via the output signal transmitter 154 that will be recognizable by the replacement stereo receiver 104.

The microcontroller 142 then determines, in decision state 260, whether a match has occurred and, if a match has occurred, the microcontroller then recalls the corresponding remote signal pattern from the memory 144 in state 262 and then outputs the appropriate IR signal via the output signal transmitter 154 in state 264. As discussed above, the replacement stereo receiver 104 is preferably adapted to receive signals, such as wireless signals, including I/R signals, from the remote control 160. Preferably, the microcontroller 142 is programmed such that it is capable of reproducing the same wireless signal that would be provided by the handheld remote unit 160.

Hence, the user can program the interface circuit 110 such that controls, such as increase or decrease volume, change channels and the like, on the steering wheel or some other remote location within the vehicle can be used to generate corresponding wireless signals from the interface circuit 110. The interface circuit 110 thereby allows factory installed vehicle remote controls for a factory stereo to continue to be used with a replacement stereo receiver after the factory stereo receiver has been replaced. This greatly increases the flexibility for individuals wishing to replace their factory stereos as it does not eliminate the utility of the remote vehicle controls.

Although the preferred embodiments of the present invention have shown, described and pointed out the fundamental novel features of the invention as applied to those embodiments, it will be understood that various omissions, substitutions and changes in the form of the detail of the device illustrate may be made by those skilled in the art without departing from the spirit of the present invention. Consequently, the scope of the invention should not be limited to the foregoing description but is to be defined by the appended claims.

What is claimed is:

1. An aftermarket stereo control interface device adapted to be installed in a vehicle and to facilitate communication between a local stereo control configured to produce signals in a first format and a stereo receiver configured to receive signals in a second format, the aftermarket stereo control interface device comprising:
    a receiver adapted to receive at least one input signal, the at least one input signal compnsing a control signal in the first lormat configured to control the stereo receiver;
    a transmitter adapted to produce and broadcast to the stereo receiver an output signal in the second format, the output signal being based on the input signal; and
    a memory;
    wherein:
        the local stereo control is mounted in the vehicle at a location remote from the stereo receiver;
        the aftermarket stereo control interface device translates signals in the first format to signals in the second format so that the local stereo control can be operated to control the operation of the stereo receiver via
        the aftermarket stereo control interlace, and
        the aftermareat stereo control interlace is programmable to store in the memory output signals corresponding to the local stereo control such that subsequent activation of the local stereo control results in the aftermarket stereo control interface recalling from the memory at least one output signal corresponding to the local stereo control and wherein the stereo receiver is an after-market stereo receiver and wherein the aftermarket stereo control interface is programmable so that the interface can be adapted for use with a plurality of different types of aftermarket stereo receivers.

2. The device of claim 1, wherein the at least one input signal comprises a wireless signal.

3. The device of claim 2, wherein the wireless signal is produced by a handheld remote control transmitter.

4. The device of claim 3, wherein the interface device includes a program mode wherein the stereo control interface device can be programmed via the handheld remote control transmitter.

5. The device of claim 1, wherein the stereo control interface device is configurable to be adapted to more than one different makes or models of a vehicle.

6. The device of claim 1, wherein the stereo control is a switch disposed on a steering mechanism of the vehicle.

7. The device of claim 6, wherein the vehicle is a motorcycle and the steering mechanism of the vehicle is the handlebars of the motorcycle.

8. The device of claim 1, wherein the stereo control interface device is hardwired to the stereo control.

9. A method of facilitating communication between a local stereo control configured to produce signals in a first format and an aftermarket stereo receiver configured to receive signals in a second format, the method using an aftermarket stereo control interface device, the method comprising:

receiving at least one input signal at the aftermarket stereo control interface, the at least one input signal comprising a control signal in the first format configured to control the aftermarket stereo receiver;

using the aftermarket stereo control interface device to translate the at least one input signal in the first format to an output signal in the second format so that the local stereo control can be operated to control the operation of the aftermarket stereo receiver via the aftermarket stereo control interface;

transmitting to the aftermarket stereo receiver the output signal in the second format, the output signal being based on the input signal;

storing in memory a plurality of output signals corresponding to the local stereo control; and upon subsequent activation of the local stereo control recalling from the memory at least one output signal corresponding to the local stereo control, and wherein the aftermarket stereo control interface is programmable so that the interface can be adapted for use with a plurality of different types of aftermarket stereo receivers.

10. The method of claim 9, wherein the receiving comprises receiving a wireless signal.

11. The method of claim 9, wherein the transmitting comprises transmitting using a remote handheld transmitter.

12. The method of claim 11, further comprising programming the stereo control via the handheld remote control transmitter.

13. The method of claim 9, wherein the stereo control interface device is configurable to be adapted to more than one different makes or models of a vehicle.

14. The method of claim 9, wherein the stereo control is a switch disposed on a steering mechanism of the vehicle.

15. The method of claim 14, wherein the vehicle is a motorcycle and the steering mechanism of the vehicle is the handlebars of the motorcycle.

16. The method of claim 9, wherein the stereo control interface device is hardwired to the stereo control.

* * * * *

UNITED STATES PATENT AND TRADEMARK OFFICE
CERTIFICATE OF CORRECTION

| | | |
|---|---|---|
| PATENT NO. | : 8,014,540 B2 | Page 1 of 1 |
| APPLICATION NO. | : 12/605950 | |
| DATED | : September 6, 2011 | |
| INVENTOR(S) | : Brett D. Riggs | |

It is certified that error appears in the above-identified patent and that said Letters Patent is hereby corrected as shown below:

In Claim 1:

At column 12, line 41, the printed patent should read --...signal comprising a control...--.

At column 12, line 42, the printed patent should read --first format configured...--.

At column 12, line 54, the printed patent should read --...control interface, and--.

At column 12, line 55, the printed patent should read --the aftermarket stereo...--.

At column 12, line 55, the printed patent should read --...control interface is...--.

Signed and Sealed this
Sixth Day of December, 2011

David J. Kappos
*Director of the United States Patent and Trademark Office*